Figure 1:
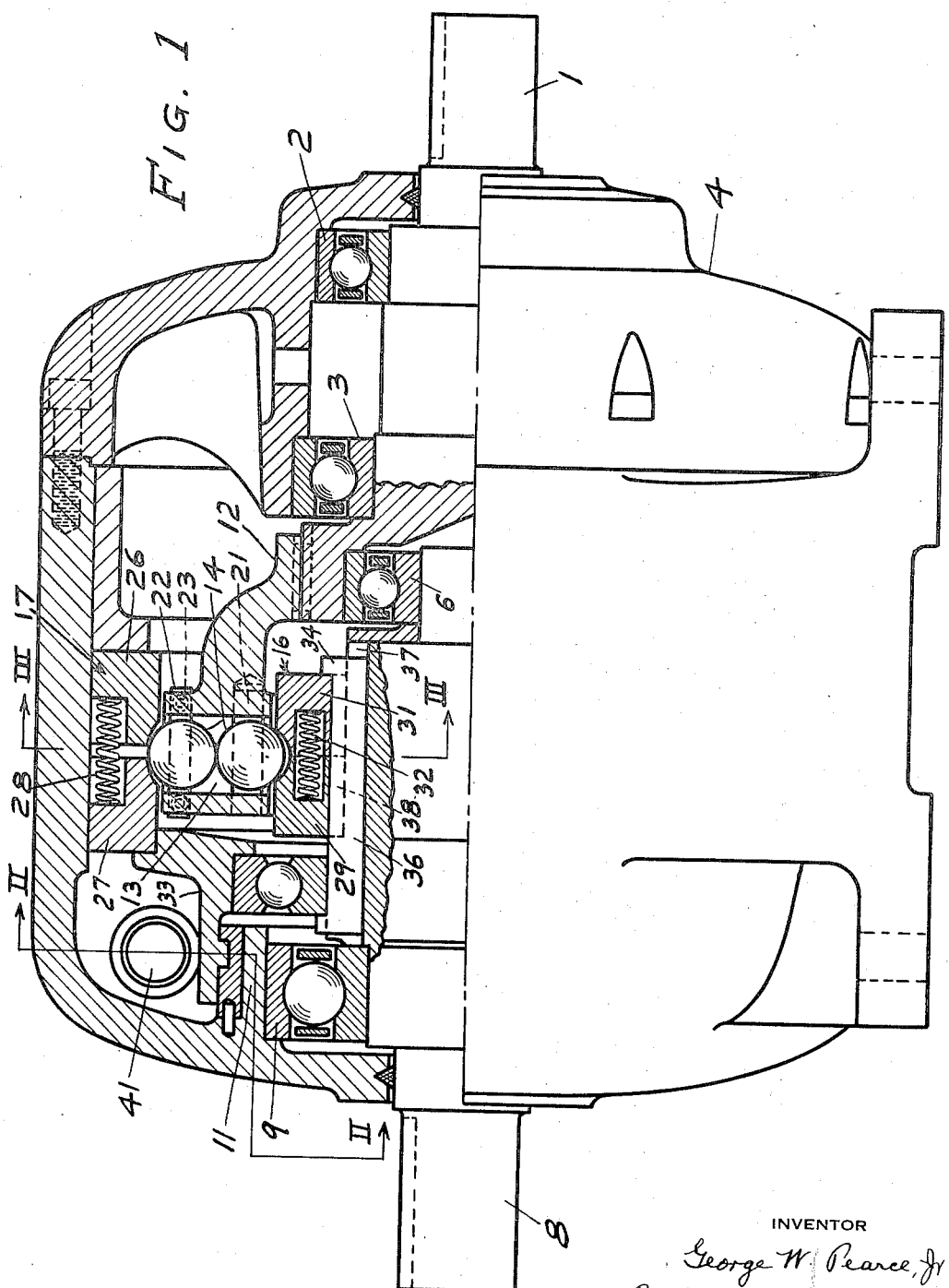

June 25, 1940.  G. W. PEARCE, JR  2,205,768
TRANSMISSION
Filed May 6, 1939  2 Sheets-Sheet 1

INVENTOR
George W. Pearce, Jr.
By Brown, Critchlow & Flick
his Attorneys.

June 25, 1940.   G. W. PEARCE, JR   2,205,768
TRANSMISSION
Filed May 6, 1939    2 Sheets-Sheet 2
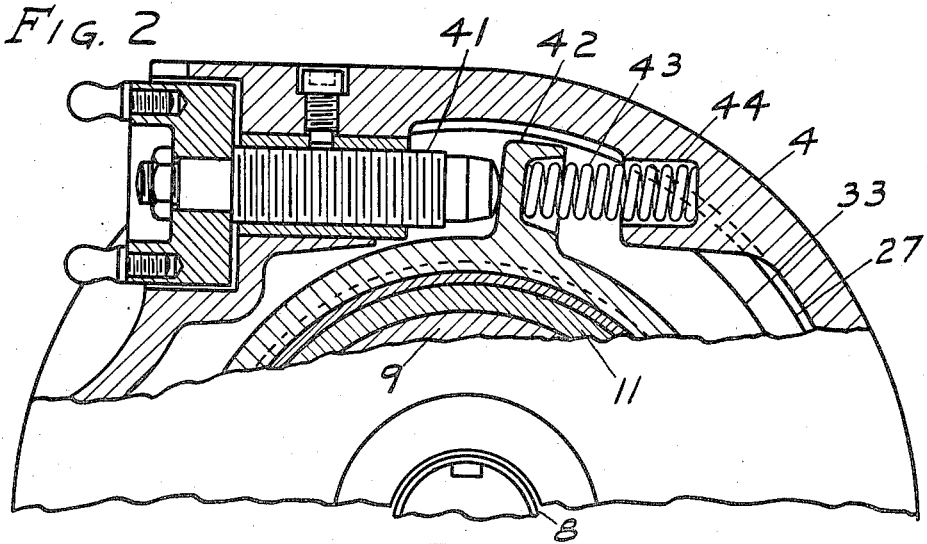
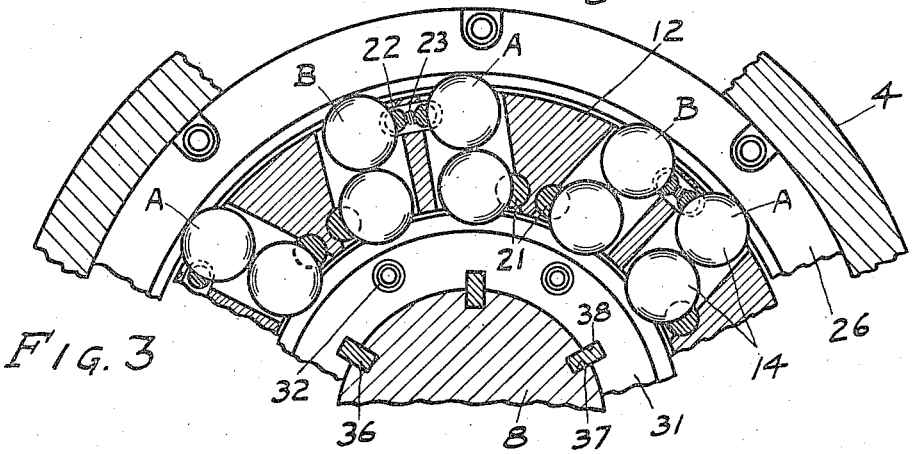
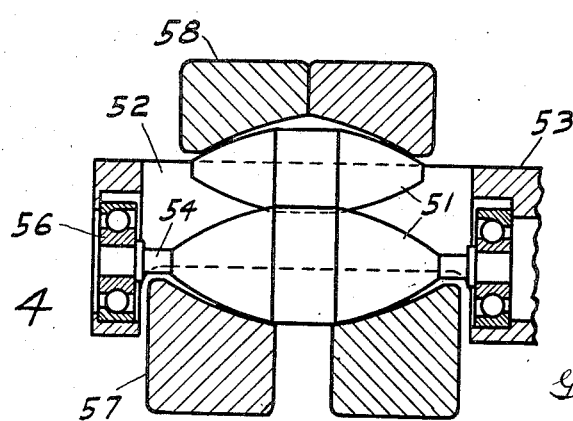
INVENTOR
George W. Pearce, Jr.
By Brown, Critchlow & Flick
his Attorneys Patented June 25, 1940

2,205,768

UNITED STATES PATENT OFFICE 2,205,768

TRANSMISSION

George W. Pearce, Jr., Pittsburgh, Pa.

Application May 6, 1939, Serial No. 272,212

15 Claims. (Cl. 74—281)

This invention relates to power transmissions, and more particularly to gearless transmissions in which power is transmitted by means of a cage carrying a plurality of rotatable elements.

Transmissions of this character proposed heretofore have had too great internal friction losses to be efficient. They have also been subject to slippage of the transmission elements therein when the torque on the output shaft becomes large or changes suddenly. Furthermore, their speed-varying means have been complicated or unsatisfactory, and their capacities have been relatively small. Likewise, in prior units there has been considerable backlash.

It is among the objects of this invention to provide a power transmission which operates forward or backward equally well, which does not slip under heavy or sudden torque on its output shaft, which has large capacity, which is reversible without backlash, which can be readily varied in speed ratio, and which is relatively simple in construction and operation.

In accordance with this invention the intermediate member of three coaxial members is provided with a plurality of circumferentially spaced openings. Disposed in each of these openings is a set of contacting rotatable elements, either balls or rollers, which are adapted to project from the opening and frictionally engage the other two members. One of the coaxial members is connected to a source of power input, and the other serves as a driven member for power output. The rotatable elements in each opening are so disposed that their axes are offset relative to each other in the direction of rotation of the driving and driven members. When the driving member is rotated it causes the rotatable elements in each set to be pressed together and against the two members that they frictionally engage, whereby the rotatable element that engages the driven member rotates the latter either forward or backward, depending on whether the peripheral speed of that element is greater or less than the lineal speed of its axis. The two members with which the rotatable elements project into frictional engagement are provided with grooves forming races for these elements. By varying the widths of these two grooves in opposite directions at the same time, the speed ratio of the transmission can be changed. The particular mounting of the rotatable elements in the intermediate member greatly reduces friction in the transmission, and also loads the rotatable elements in accordance with the torque on the output shaft so that slippage does not occur. In reversible transmissions the rotatable elements are so disposed that some function when the output shaft is being driven in one direction, and the others function when it is driven in the opposite direction, thereby avoiding backlash.

The invention is illustrated in the accompanying drawings in which Fig. 1 is a side view of my transmission partly in vertical section; Fig. 2 is an end view partly in section taken on the line II—II of Fig. 1; Fig. 3 is a fragmentary vertical section taken on the line III—III of Fig. 1; and Fig. 4 is a fragmentary section, similar to Fig. 1, illustrating a modification of the invention.

Referring to Fig. 1 of the drawings, one end of an input power shaft 1 is rotatably mounted in ball bearings 2 and 3 in one end of a transmission housing 4. The inner end of this shaft is provided with a cylindrical recess in which a ball bearing 6 is mounted which rotatably supports the inner end of an output shaft 8 projecting from the opposite end of the housing. The outer portion of this shaft in the housing is mounted in a ball bearing 9 supported by an annular rib 11 projecting inwardly from the adjacent end of the housing. The two shafts are thus journaled on the same axis and project from opposite ends of the transmission housing.

Mounted on the inner end of the input shaft is an annular cage or intermediate member 12 that projects axially beyond the end of the shaft and encircles the output shaft between bearings 6 and 9 that support the latter. The cage turns with the input shaft, but is slidably axially thereof for a purpose to be described later. The free end of the cage is provided with a plurality of circumferentially spaced openings 13 extending in a general radial direction therethrough (Fig. 3). Each of these openings contains a set of rotatable elements, in this case a pair of metal balls 14 that engage each other and project out of the opposite ends of the opening where they are adapted to frictionally engage inner and outer coaxial races 16 and 17 mounted on the output shaft and the inner wall of the transmission housing, respectively.

It is a feature of this invention that the elements of this transmission do not slip under any load, even though applied suddenly. That is, the frictional engagement of the various elements with one another increases as the torque on the output shaft increases. Accordingly, as shown in Fig. 3, the axes or centers of the balls in each opening 13 are offset relative to each other in the direction and plane of rotation of the cage. That is, a common line through the centers of each pair of balls will pass to one side of the axis of rotation of the cage. To permit the output shaft to be rotated in either direction with equal efficiency, some of the inner balls are offset to the right of the outer balls, as viewed in Fig. 3, and the rest of the inner balls are offset to the left of the outer balls. Preferably, alternate sets A and B are thus offset in opposite directions. In order that the various sets may be placed close together so that a relatively large number of balls may be mounted in the cage, each ball-receiving opening is preferably of circular cross section only slightly larger than the balls and with its axis directed toward one side or the other of the axis of the cage. Also, by inclining these openings in this manner while the balls that are placed therein are automatically offset in the manner described above.

When the cage is rotated by the input shaft in a clockwise direction, as viewed in Fig. 3, the balls of sets B serve no purpose, but the inner balls in sets A are rotated about their centers by their frictional engagement with the inner race in a clockwise direction likewise, and the outer balls in sets A are rotated by the frictional engagement with the inner balls and outer race in a counterclockwise direction. The rotation of the inner balls against inner race 16 tends to turn it in a counterclockwise direction, but the reaction to that turning force tends to carry the inner balls bodily to the right in their respective cage openings 13. Nevertheless, as the outer balls tend to move bodily toward the left in the cage openings, and as they are farther from the axis of the cage than the inner balls so that they exert greater leverage, they hold the inner balls against the left-hand or rear walls of those openings which roll them ahead. The outer and inner balls, by trying to move bodily in opposite directions in this manner, tend to bring their centers more nearly into line with the radius of the cage. This results in the balls being pressed tightly together and against the two races between which they are mounted. It will be understood from this that as the torque on the output shaft is increased, the more tightly the balls are pressed or wedged together and against the races, thereby avoiding slippage. Also, sudden increases in load immediately bring about the same result in a direct, positive manner.

When the direction of rotation of the cage is reversed, the A sets of balls cease to function and the B sets immediately start to rotate the output shaft because the balls of the B sets are pressed tightly together by counterclockwise rotation of the cage.

If the effective radius of each outer ball, by which is meant the shortest distance from the axis of the ball to a parallel line through the point or points at which it engages the outer race, is equal to or less than the effective radius of the inner ball, the peripheral speed of rotation of the inner balls is greater than the lineal speed of their centers and therefore they rotate the inner race and output shaft in a direction reverse to that in which they are traveling with the cage. But if the effective radius of the outer balls is increased over that of the inner balls, a point is soon reached where the peripheral speed of the inner balls is less than the lineal speed of their centers, and they then drive the output shaft in the same direction in which the cage is turning. Means for changing the effective radius of the balls for this purpose is described hereinafter.

Friction within the cage is small because the outer balls engage only the inner balls and outer race without touching the front or rear walls of the cage openings. Friction between the inner balls and the rear walls of the openings can be decreased by inserting bearing members between them. Preferably, these take the form of cylindrical pins 21 rotatably mounted on horizontal axes in the rear walls of the cage openings and each provided with a central spherical socket for receiving a portion of the adjoining inner ball. This gives a larger area of contact between ball and cage and permits satisfactory lubrication. The pin turns slightly to accommodate the movements of the ball axially of the cage opening.

To assure the balls immediately "taking hold" when the cage starts to rotate, they are at all times biased into frictional engagement with the two races. This may be done in various ways, such as by pairs of pins 22, similar to bearing pins 21, mounted in the cage between adjacent outer balls with coil springs 23 compressed between their ends.

Another feature of this invention is that the speed ratio may be readily changed. Accordingly, each of the ball races is provided in its center with a concave peripheral groove the opposite halves of which are formed on radii greater than the radius of the adjoining ball. Each race is divided through its center into two parts so that when these two parts are together the balls engage the groove near its outer edges, while if the two parts of the race are separated the balls engage the two halves of the groove at a point between their inner and outer edges. By moving the two halves of a race toward or away from each other, the effective radius of each ball engaging it is changed. The right-hand half 26 of the outer non-rotatable race, as seen in Fig. 1, is mounted in a stationary position, but the left-hand half 27 is biased axially away from it by means of coil springs 29 mounted in sockets in the adjacent faces of the two halves. The left-hand half 29 of the inner race, non-rotatable relative to the output shaft, is mounted in fixed position, but its right-hand half 31 is biased away from it by coil springs 32 disposed in sockets in the adjoining side walls of the halves.

As it is necessary that one groove be widened when the other is narrowed, the movable half 27 of the outer race is engaged by a coaxial adjustable ring 33 threaded on the annular rib 11 of the transmission housing. The movable half 31 of the inner race engages radial projections 34 of keys 36 that are slidably mounted in radial keyways 37 and 38 extending longitudinally of the output shaft and inner race, respectively, (Fig. 1). When threaded ring 33 is turned inwardly it moves outer race half 27 towards the inner half, and permits the inner race half 31 and keys 36 to be moved to the right by coil springs 32. At the same time cage 12 slides to the right on the inner end of the input shaft to keep the balls in the central plane of the two peripheral race grooves.

The threaded ring is preferably turned or adjusted by means of a manually adjustable screw 41 threaded in a boss in the transmission housing and engaging a radial projection 42 on the ring. This projection is biased against the inner end of the screw by means of a coil spring 43 disposed in a socket 44 in the side wall of the housing. The screw is preferably provided with micrometer graduations.

It will be understood that this invention is not limited to driving of the cage, as it may serve as the driven member or be stationary and either the inner or the outer race could be the driver. Also, the invention is not restricted to the cage and one race encircling the inner race, because they might be disposed in other relations.

In the embodiment of the invention disclosed in Fig. 4 of the drawings, rollers 51 have been substituted for the balls in circumferentially spaced openings 52 in a cage 53. In this case the cage is stationary and each inner roller is preferably provided at its ends with necks 54 that are mounted in ball bearings 56 disposed for limited radial movements in cage opening 52. The inner race 57 is preferably mounted on the drive shaft, and the outer race 58 is mounted on a driven member. To permit the speed ratio to be changed, the ends of these rollers are tapered on a radius which is less than the radius of the adjacent race grooves. When one groove is widened relative to the other, that race will engage an adjoining roller at points closer together but farther from the axis of the roller than the other race, thereby changing the effective radius of the roller. As far as operation and advantages are concerned, these rollers function in substantially the same way as the balls of the first embodiment. However, they have greater capacity than the balls and are therefore more suited to transmissions requiring great capacity.

According to the provisions of the patent statutes, I have explained the principle and construction of my invention and have illustrated and described what I now consider to represent its best embodiments. However, I desire to have it understood that, within the scope of the appended claims, the invention may be practiced otherwise than as specifically illustrated and described.

I claim:

1. A power transmission comprising three coaxial members one of which is a driver and another driven, the intermediate member being provided with a plurality of circumferentially spaced openings therethrough, and a set of rotatable elements disposed in each opening and adapted to project therefrom into frictional engagement with the other two members, the axes of the rotatable elements in each set being offset relative to each other in the direction of rotation of said members to such a degree that rotation of said driver member wedges each of said elements between the adjoining member and adjoining element with sufficient force to prevent slipping under all load conditions, whereby said driven member is rotated.

2. A power transmission comprising three coaxial members one of which is a driver and another driven, the intermediate member being provided with a plurality of circumferentially spaced openings therethrough, a set of rotatable elements disposed in each opening and adapted to project therefrom into frictional engagement with the other two members, the axes of the rotatable elements in each set being offset relative to each other in the direction of rotation of said members to such a degree that rotation of said driver member wedges each of said elements between the adjoining member and adjoining element with sufficient force to prevent slipping under all load conditions, whereby said driven member is rotated, a common line through the axes of said elements in each of some of said sets passing one side of the axis of said intermediate member, and a common line through the axes of said elements in each of other of said sets passing the opposite side of said axis.

3. A transmission comprising coaxial inner and outer and intermediate members, one of said members being a driver and another driven, said intermediate member being provided with a plurality of circumferentially spaced openings therethrough, and a set of contacting rotatable elements disposed in each opening and adapted to project therefrom into frictional engagement with said inner and outer members, the axes of the rotatable elements in each set being offset relative to each other in the direction of rotation of said members to such a degree that rotation of said driver member wedges the inner and outer elements between the adjoining elements and their adjoining members with sufficient force to prevent slipping under all loading conditions, whereby said driven member is rotated.

4. A power transmission comprising a driven member, a driving member encircling it and provided with a plurality of circumferentially spaced openings therethrough, a race encircling the driving member, and a set of contacting rotatable elements disposed in each opening and adapted to project therefrom into frictional engagement with said driven member and race, the axes of the rotatable elements in each set being offset relative to each other in the direction of rotation of said members to such a degree that rotation of said driving member wedges the inner and outer elements between the adjoining element and the respective adjoining member with sufficient force to prevent slipping under all load conditions, whereby said driven member is rotated.

5. A power transmission comprising three coaxial members one of which is a driver and another driven, the intermediate member being provided with a plurality of circumferentially spaced openings therethrough, the axis of each opening being directed toward one side of the axis of said intermediate member, and a set of contacting rotatable elements disposed in each opening and adapted to project therefrom into frictional engagement with the other two members, to such a degree that rotation of said driver member wedges each of said elements between the adjoining member and adjoining element with sufficient force to prevent slipping under all load conditions, whereby said driven member is rotated.

6. A power transmission comprising three coaxial members one of which is a driver and another driven, the intermediate member being provided with a plurality of circumferentially spaced openings therethrough, the axes of some of said openings being directed toward one side of the axis of said intermediate member and the axes of others of said openings being directed toward the opposite side of said axis, and a set of contacting rotatable elements disposed in each opening and adapted to project therefrom into frictional engagement with the other two members, to such a degree that rotation of said driver member wedges each of said elements between the adjoining member and adjoining element with sufficient force to prevent slipping under all load conditions, whereby said driven member is rotated.

7. A power transmission comprising three coaxial members one of which is a driver and another driven, the intermediate member being provided with a plurality of circumferentially spaced openings therethrough, a set of rotatable elements disposed in each opening and adapted to project therefrom into frictional engagement with the other two members, the axes of the rotatable elements in each set being offset relative to each other in the direction of rotation of said members whereby rotation of said driver member presses said elements together and against said other two members for rotating said driven member, and means for varying the points of engagement of said elements with said other two members radially of the latter.

8. A power transmission comprising coaxial inner and outer and intermediate members, one of said members being a driver and another driven, said intermediate member being provided with a plurality of circumferentially spaced openings therethrough, a set of contacting rotatable elements disposed in each opening and adapted to project therefrom into engagement with said inner and outer members, said inner and outer members being provided with opposed peripheral grooves receiving said elements, and means for varying the widths of said grooves, the axes of the rotatable elements in each set being offset relative to each other in the direction of rotation of said members whereby rotation of said driver member presses said elements together and against said inner and outer members for rotating said driven member.

9. A power transmission comprising coaxial inner and outer and intermediate members, one of said members being a driver and another driven, said intermediate member being provided with a plurality of circumferentially spaced openings therethrough, a set of contacting rotatable elements disposed in each opening and adapted to project therefrom into frictional engagement with said inner and outer members, said inner and outer members being provided with opposed peripheral grooves receiving said elements, and means for varying the widths of said grooves in opposite directions.

10. A power transmission comprising coaxial inner and outer and intermediate members, one of said members being a driver and another driven, said intermediate member being provided with a plurality of circumferentially spaced openings therethrough, a set of contacting rotatable elements disposed in each opening and adapted to project therefrom into frictional engagement with said inner and outer members, said inner and outer members being provided with opposed peripheral grooves receiving said elements, and screw-threaded means for varying the widths of said grooves in opposite directions.

11. A power transmission comprising three coaxial members one of which is a driver and another driven, the intermediate member being provided with a plurality of circumferentially spaced openings therethrough, a set of rotatable elements disposed in each opening and adapted to project therefrom into frictional engagement with the other two members, the axes of the rotatable elements in each set being offset relative to each other in the direction of rotation of said members whereby rotation of said driver member presses said elements together and against said other two members for rotating said driven member, and means for pressing said elements together when they are not rotating.

12. A power transmission comprising three coaxial members one of which is a driver and another driven, the intermediate member being provided with a plurality of circumferentially spaced openings therethrough, a set of rotatable elements disposed in each opening and adapted to project therefrom into frictional engagement with the other two members, the axes of the rotatable elements in each set being offset relative to each other in the direction of rotation of said members whereby rotation of said driver member presses said elements together and against said other two members for rotating said driven member, and a movable bearing member receiving the thrust of one of said elements in each set and carried by said intermediate member.

13. A power transmission comprising coaxial inner and outer and intermediate members, one of said members being a driver and another driven, said intermediate member being provided with a plurality of circumferentially spaced openings therethrough, a set of contacting rollers disposed in each opening and adapted to project therefrom into frictional engagement with said inner and outer members, said inner and outer members being provided with opposed pairs of transversely curved peripheral surfaces against which the ends of said rollers bear, said ends of the rollers being tapered, and means for varying the spacing between the curved surfaces of each of said pairs.

14. A variable speed transmission comprising three coaxial members one of which is a driver and another driven, the intermediate member being provided with a plurality of circumferentially spaced openings therethrough, and a set of rotatable elements disposed in each opening and adapted to project therefrom into frictional engagement with the other two members, the axes of the rotatable elements in each set being offset relative to each other in the direction of rotation of said members to such a degree that rotation of said driver member wedges each of said elements between the adjoining member and adjoining element with sufficient force to prevent slipping under all load conditions, whereby said driven member is rotated.

15. A power transmission comprising three coaxial members one of which is a driver and another driven, the intermediate member being provided with a plurality of circumferentially spaced openings therethrough, and a set of balls disposed in each opening and adapted to project therefrom into frictional engagement with the other two members, the axes of the balls in each set being offset relative to each other in the direction of rotation of said members whereby rotation of said driver member presses said balls together and against said other two members for rotating said driven member.

GEORGE W. PEARCE, Jr.